(12) United States Patent
Linnerud et al.

(10) Patent No.: US 8,947,438 B2
(45) Date of Patent: Feb. 3, 2015

(54) REDUCING FONT INSTRUCTIONS

(75) Inventors: Paul Linnerud, Woodinville, WA (US); Gregory Hitchcock, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 13/195,232

(22) Filed: Aug. 1, 2011

(65) Prior Publication Data

US 2013/0033498 A1 Feb. 7, 2013

(51) Int. Cl.
*G06T 11/60* (2006.01)
*G06F 17/21* (2006.01)

(52) U.S. Cl.
CPC .................. *G06F 17/214* (2013.01)
USPC ......................................... 345/467

(58) Field of Classification Search
CPC .............................. G06T 11/203; G06T 11/20
USPC ......................................... 345/467
See application file for complete search history.

(56) References Cited

U.S. PATENT DOCUMENTS

| | | | |
|---|---|---|---|
| 5,577,177 A * | 11/1996 | Collins et al. ................ | 345/469 |
| 5,982,387 A | 11/1999 | Hellmann | |
| 6,232,987 B1 | 5/2001 | Choi | |
| 6,426,751 B1 | 7/2002 | Patel et al. | |
| 6,678,410 B1 | 1/2004 | Phinney | |
| 7,006,108 B2 | 2/2006 | Perry | |
| 7,184,046 B1 | 2/2007 | Hawkins | |
| 7,573,476 B2 | 8/2009 | Matskewich et al. | |
| 2002/0118885 A1 | 8/2002 | Smeets et al. | |
| 2003/0043151 A1 | 3/2003 | Choi et al. | |
| 2006/0244985 A1* | 11/2006 | Fahraeus et al. ............ | 358/1.12 |
| 2007/0011440 A1* | 1/2007 | Niitsuma ..................... | 712/217 |
| 2008/0049023 A1 | 2/2008 | Opstad | |
| 2008/0165193 A1 | 7/2008 | Stamm et al. | |
| 2013/0057554 A1 | 3/2013 | Linnerud et al. | |

OTHER PUBLICATIONS

International Search Report cited in PCT Application No. PCT/US2011/055533 dated Jun. 21, 2012, 9 pgs.
"Designing with Interactive Example Galleries", Brian Lee, Savil Srivastava, Ranjitha Kumar, Ronen Brafman and Scott R. Klemmer, CHI 2010: Perspectives on Design, Apr. 10-15, 2010, Atlanta, GA, pp. 2257-2266.
"Reducing Truetype Font File Size for Embedded Systems", Retrieved at <<http://www.cnx-software.com/2010/02/19/reducing-truetype-font-file-size-for-embedded-systems/>>, Feb. 19, 2010, pp. 8.

(Continued)

*Primary Examiner* — Javid A Amini
(74) *Attorney, Agent, or Firm* — Timothy Churna; Kate Drakos; Micky Minhas

(57) ABSTRACT

One or more techniques and/or systems are disclosed for reducing font execution instructions for a font, and thereby a file size for the font. The font execution instructions can be scanned (e.g., by examining tables) to identify one or more common instruction sets in the font execution instructions. A function can be defined for a common instruction set, and the instances or appearances of the common instruction set in the font execution instructions can be replaced with a call to the function. Because the call is generally smaller (e.g., comprises fewer lines of code) than the common instruction set it replaces, the number of execution instructions for the font is reduced.

20 Claims, 9 Drawing Sheets

(56) References Cited

OTHER PUBLICATIONS

"Optimization options", Retrieved at <<http://www.adobe.com/svg/illustrator/optimization.html>>,Retrieved Date: May 2, 2011, pp. 2.
"The TrueType instruction set", Retrieved at <<http://www.microsoft.com/typography/otspec/ttinst.htm>>, 1997, p. 1.
Yahya; et al., "An Automatic Generation of G1 Curve Fitting of Arabic Characters using Rational Bezier Cubic with Weight Adjustments"—Published Date: Dec. 6-8, 2005, http://eprints.usm.my/506/1/An__Automatic__Generation__Of__G1__Curve__Fitting__Of__Arabic__Characters__Using__Rational__Bezier__Cubic__With__Weight__Adjustments.pdf.
Piska, Karel, "Creating Type 1 Fonts from Metafont Sources: Comparison of Tools, Techniques and Results"—Published Date: Sep. 3, 2004, http://www-hep2.fzu.cz/~piska/TUG2004/piskatb2.pdf.
"AAT Font Quality Specification"—Retrieved Date: May 6, 2011 http://developer.apple.com/fonts/TTQualSpec/QS02/FQS2.html.
"Glyf—Glyf Data", Retrieved Date: May 9, 2011, http://www.microsoft.com/typography/otspec/glyf.htm.

* cited by examiner

REDUCING FONT INSTRUCTIONS

BACKGROUND

In a computing environment, a computer font can comprise a style of characters (e.g., alphanumeric characters) in a particular typeface. Computer fonts can typically be scaled to larger or smaller sizes, bolded and/or italicized while retaining their typeface style. Characteristics of a font can comprise a stroke width (weight), character slope or angle, and character width (e.g., as well as height). Metrics for rendering (e.g., rasterizing) fonts on a display may comprise metadata describing individual glyphs for respective characters of the font. Computer fonts can comprise or rather be comprised within programs (e.g., in one or more font files) that may utilize programming language to describe how the respective glyphs are rendered by a rasterizing component, for display to a user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Some computer fonts may comprise a mechanism where a scaled outline of a character can be adjusted to achieve desired output on a target device. An op code based interpreted language, which is similar to assembly language, may be used by many fonts and may be interpreted by a rasterizer to accomplish the adjustments known as instructing or hints. In a font, there may be instructions associated with respective glyphs as well as global instructions that can be applied to text sizes and/or the font itself.

Some computer fonts comprise a collection of tables, for example, where respective tables are identified by a unique tag. Glyphs in a font can be defined in a glyph table. As an example, a glyph definition may comprise instructions that are executed with respective glyphs of the font and a mathematical representation of the outline of the font. A set of global instructions that are executed for respective font sizes can be contained in a pre-program, sometimes referred to as a control value program (prep) table, for example. Another set of global instructions that are executed for the font can be comprised in a font program (fpgm), for example. All of these instructions can add significantly to a size of the one or more files associated with any particular font.

Accordingly, one or more techniques and/or systems are disclosed for reducing an amount of font execution instructions, for example, comprised in the one or more files of the font. For example, a total volume of instructions contained in one or more tables for a font can be reduced, while a functional equivalence of these instructions for the original font can be maintained. The font execution instructions can comprise sets of instructions that are the same in several places in the font, for example. Accordingly, at least some of these "common" instructions (e.g., common instruction sets) may be replaced with merely a few (e.g., one or two, etc.) line function calls to functions that have been defined for the common instruction sets. Replacing the common instruction sets with function calls, for example, can result in compressed font execution instructions, while maintaining the functional equivalence of the uncompressed font.

In one embodiment of reducing font execution instructions for a font, one or more common instruction sets can be identified in the font execution instructions. Further, a function can be defined in the font for an identified common instruction set. Additionally, the identified common instruction set can be replaced in the font execution instructions with a call to the corresponding defined function, resulting in a reduced set of font execution instructions.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
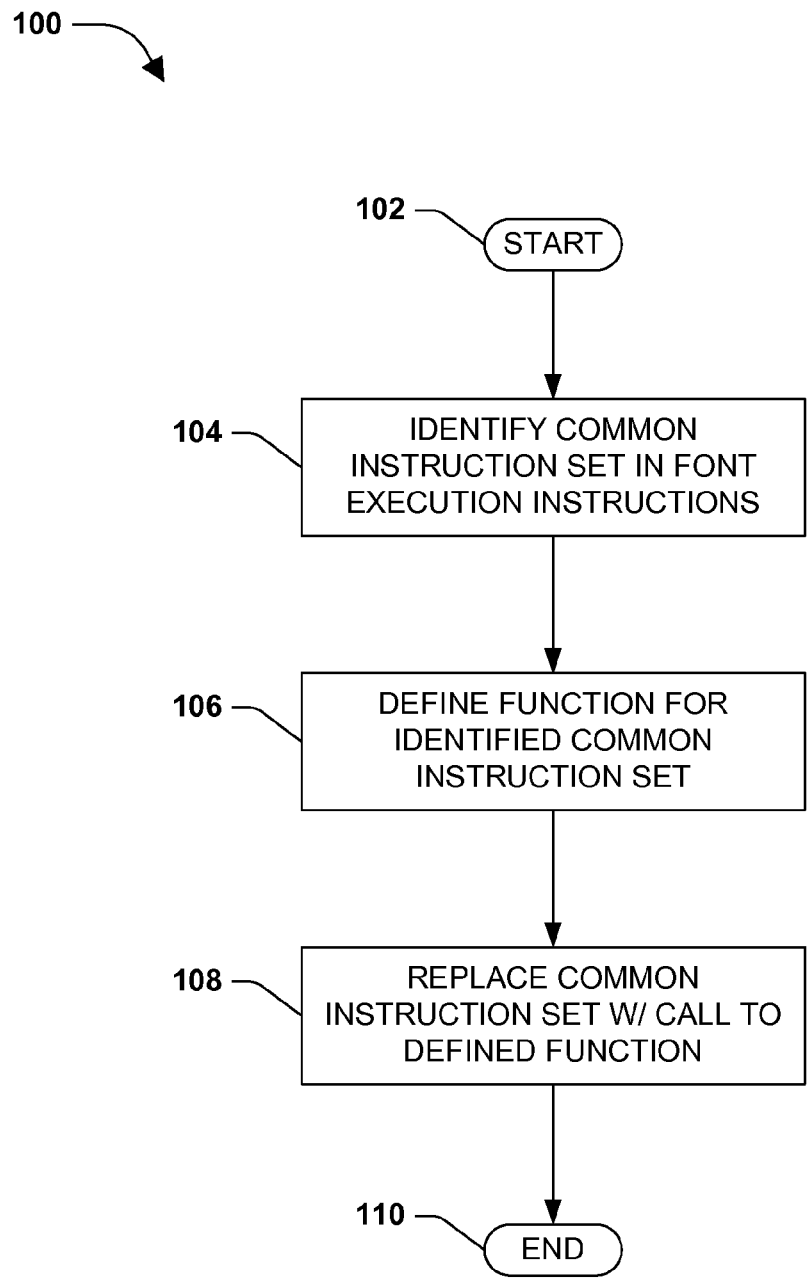
FIG. 1 is a flow diagram illustrating an exemplary method for reducing execution instructions for a font.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for reducing a file size of a font by reducing (e.g., consolidating) font execution instructions contained in one or more of tables, for example, for the font, while maintaining functional equivalence of the font prior to reduction. As an example, fonts may utilize an "op-code" based interpreted language that is similar to assembly language, comprising instructions or "hints". This op-code language can be interpreted by a rasterizer when rendering the font on a target device. A font may comprise a collection of tables, for example, which respectively comprise the font instructions (e.g., glyph instructions and global instructions). In this example, a total amount of instructions (e.g., in the font tables) can be reduced.

FIG. 1 is a flow diagram illustrating an exemplary method 100 for reducing font execution instructions for a font. The exemplary method 100 begins at 102 and involves identifying a set of common instructions in the font execution instructions, at 104. As an example, a set of common instructions can comprise a same pattern of instructions that is found in more than one location in the font execution instructions.

At 106, a function is defined for the common functions set. For example, the language used for the font execution instructions can provide for functionalization of sets of instructions, which can be called from within the font execution instructions. At 108, the common instruction set in the font execution instructions is replaced with a call to the defined function. For example, at respective common instruction set locations in the font execution instructions, the common instruction set can be removed and the call to the defined function can be inserted in its place. In this way, for example, the font execution instructions can be reduced by replacing a set of instructions, in a plurality of locations, with a call to a function. It may be appreciated that this may be repeated such that other common instruction sets are replaced with merely respective calls to defined functions to further reduce the font execution instructions.

Figure 2:
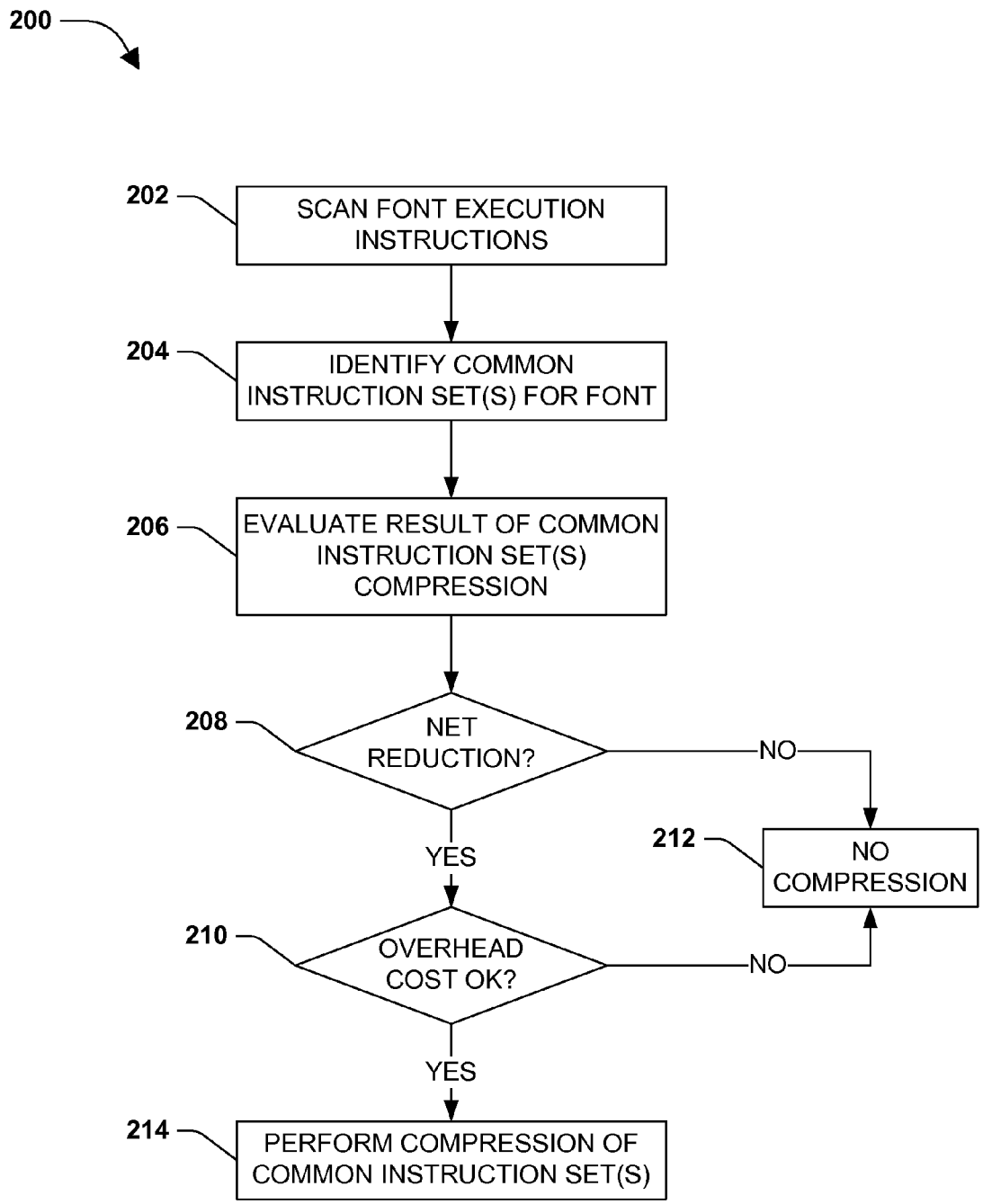
FIG. 2 is a flow diagram illustrating an example embodiment where one or more portions of one or more techniques described here may be implemented.

FIG. 2 is a flow diagram illustrating an example embodiment 200 where one or more portions of one or more techniques described here may be implemented. At 202, font execution instructions can be scanned to identify one or more of common instruction sets, at 204. In one embodiment, a common instruction set can comprise a set of one or more common font execution instructions (e.g., common glyph execution instructions) that are identified in at least two locations in the font execution instructions. As an example, a prep table can be scanned for instructions that are found in more than one location, where a set of instructions may comprise one or more lines of code used to execute the font on a target device.

Figure 3:
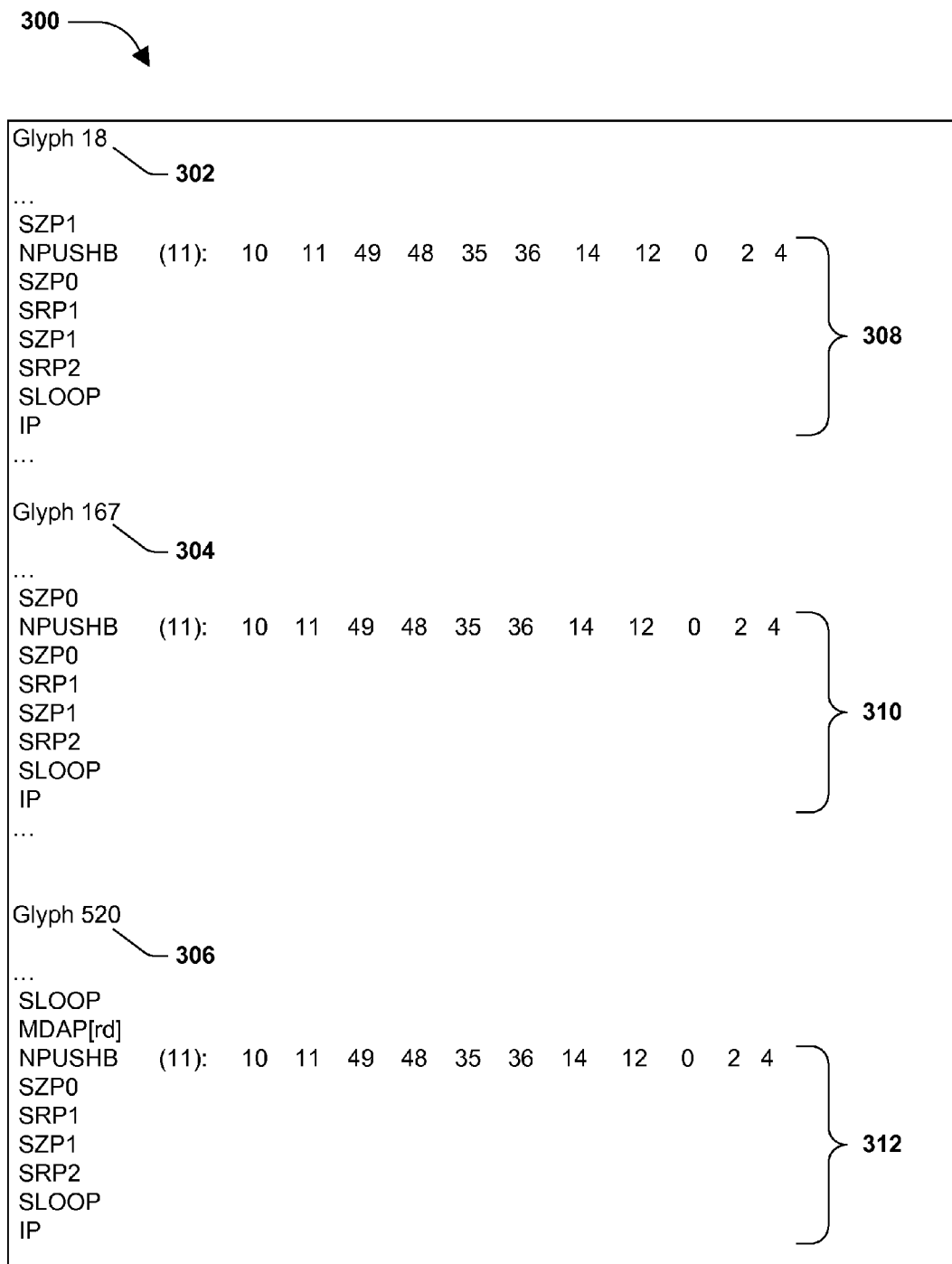
FIG. 3 is a diagram illustrating an example embodiment of font execution instructions.

As an illustrative example, FIG. 3 is a diagram illustrating an example embodiment 300 of font execution instructions. In this example 300, the font execution instructions comprise, among other things, portions of glyph instructions for three glyphs 302, 304, 306. Further, glyph eighteen 302 comprises a set of instructions 308, which can also be found, at 310, in glyph one-hundred and sixty-seven 304, and found, at 312, in glyph five-hundred and twenty 306. The same set of instructions 308, 310, 312 can comprise a common instruction set for the font execution instructions. It may be appreciated that the respective font execution instructions for glyphs 302, 304, 306 comprise more than merely sets 308, 310, 312, respectively. That is, merely the common or overlapping sets 308, 310, 312 for glyphs 302, 304, 306 are illustrated for purpose of simplicity, explanation, etc. (e.g., and additional portions of respective font execution instructions for glyphs 302, 304, 306 are not illustrated).

Returning to FIG. 2, at 206, results of a compression (e.g., replacing the common instruction set(s) with a function) of the one or more common instruction sets can be evaluated, for example, to determine whether the compression yields a desired improvement in font file size while not overly burdening computing resources used to perform the compression. In one embodiment, the evaluation of the compression can comprise determining whether a desired file size reduction threshold is met when compressing the common instruction set in the font execution instructions.

At 208, determining whether there is a desired file size reduction (e.g., meeting a reduction threshold) can comprise determining whether there is a net reduction in file size, for example, by reducing the execution instructions of the font. If the reduction threshold is not met (e.g., no net reduction) (NO at 208), no compression may be performed on the font execution instructions, at 212. If the reduction threshold is met (YES at 208), a computing resource cost for performing the compression may be determined, at 210.

In one embodiment, determining whether a desired file size reduction threshold is met can comprise identifying a performance cost for reducing the size of the font execution instructions. In this embodiment, the performance cost (e.g., computing resource cost, such as processor use, power consumption, time, and/or actual cost, etc.) can be compared against a desired performance cost threshold (e.g., where improvement in compression outweighs performance cost).

If the performance overhead cost does not meet the desired threshold (NO at 210) no compression is performed, at 212. If the performance overhead cost meets the desired threshold (YES at 210) compression of the one or more common instruction sets can be performed, at 214. For example, one or more of the common instruction sets may be replaced with a defined function, in the font execution instructions, to reduce a size of the font execution instructions.

In one aspect, a font may comprise, or rather be comprised by, an instruction set that comprises one or more operations to define one or more functions, such as removing a value from an operations stack. As an example, a TrueType font provides for at least two types of functions, the function definition (FDEF) and the instruction definition (IDEF). In this example, the FDEF comprises a standard function definition and is indicated by an FDEF at a beginning of the function block; and the IDEF comprises a custom instruction definition and is indicated by an IDEF at the beginning of a custom instruction block. Further, both of these types of functions can be terminated with the ENDF. As an illustrative example, when called, the FDEF removes a value from an operations stack to be used as a unique function number; and the IDEF removes a value from the stack to be used as a custom instruction. Additionally, in this example, standard functions are called using a "CALL" instruction that takes the function number from the stack, and custom instructions are simply executed using their defined op code.

Figure 4:
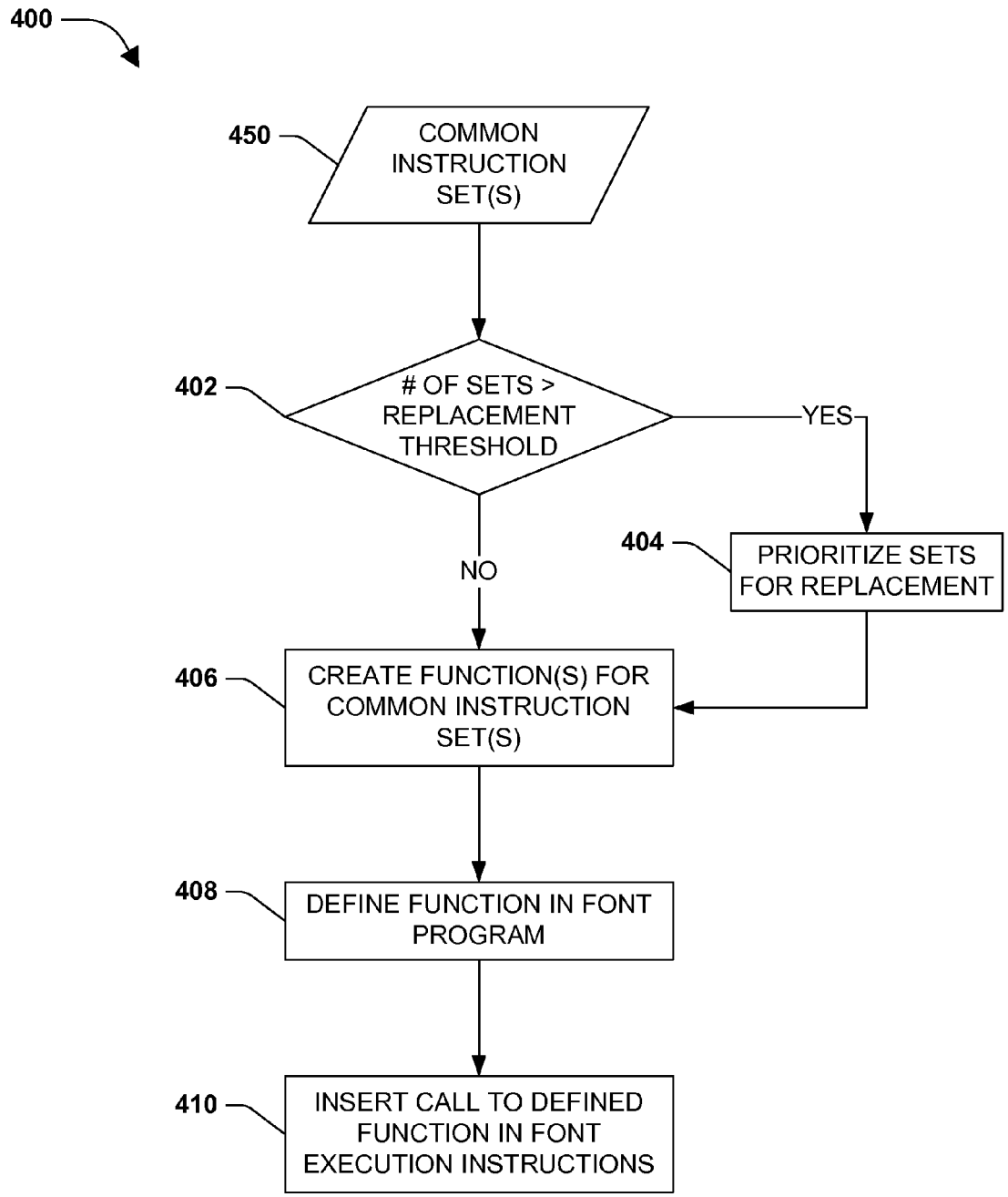
FIG. 4 is a flow diagram illustrating an example embodiment where one or more portions of one or more techniques described herein may be implemented.

FIG. 4 is a flow diagram illustrating an example embodiment 400 where one or more portions of one or more techniques described herein may be implemented. At 402, it may be determined whether a number of common instruction sets 450 is greater than a replacement threshold for the font execution instructions. For example, some font types (e.g., TrueType fonts) provide for a limited number of replacement functions. As an example, the TrueType fonts typically provides for a limited number of custom functions (IDEFs) for a font. In this example, if there are more common instruction sets than custom functions available for use for replacement, the replacement threshold may be exceeded.

In one embodiment, a custom function may be used for replacing a common instructions set before using a standard function, as a call to a custom instruction (e.g., IDEF) may comprise less computational overhead and may result in greater instruction compression than a call to the standard function (e.g., FDEF). As an example, an IDEF may comprise executing merely one instruction (e.g., "execute custom instruction 12"), while an FDEF may comprise executing two instructions (e.g., ("push 12 onto the stack; jump to the function identified by the top stack entry"). Therefore, in this embodiment, custom functions may be prioritized over standard functions until the replacement threshold is met (e.g., for the custom functions), and then the standard functions can be used, for example, for any remaining common instruction sets.

In one embodiment, the use of a custom instruction may be disabled for the common instruction set. For example, font programmers/providers may utilize the custom instructions (e.g., IDEFs) for other purposes. As an example, IDEFs are often used as patches for future instructions, such as for future versions or updates of the font. In this embodiment, for example, disabling the use of the custom instructions may mitigate possible collisions, and/or problems, with the font program. In one embodiment, the use of the standard function (e.g., FDEF) may be disabled, for example, and merely the custom instructions may be used for the common instruction sets.

At 404, in FIG. 4, the common instruction sets can be prioritized for replacement. In one embodiment, a first common instruction set can be prioritized over a second common instruction set, for example, for compression if the threshold number of common instruction sets 450 is met (YES at 402). In one embodiment, prioritization may comprise prioritizing the first common instruction set over the second common instruction set if the first common instruction set is found in more locations in the font execution instructions than the second common instruction set (is found in the font execution instructions). In one embodiment, prioritization may comprise prioritizing the first common instruction set, which has a greater number of font execution instructions, over the second common instruction set that has fewer font execution instructions.

Figure 5:
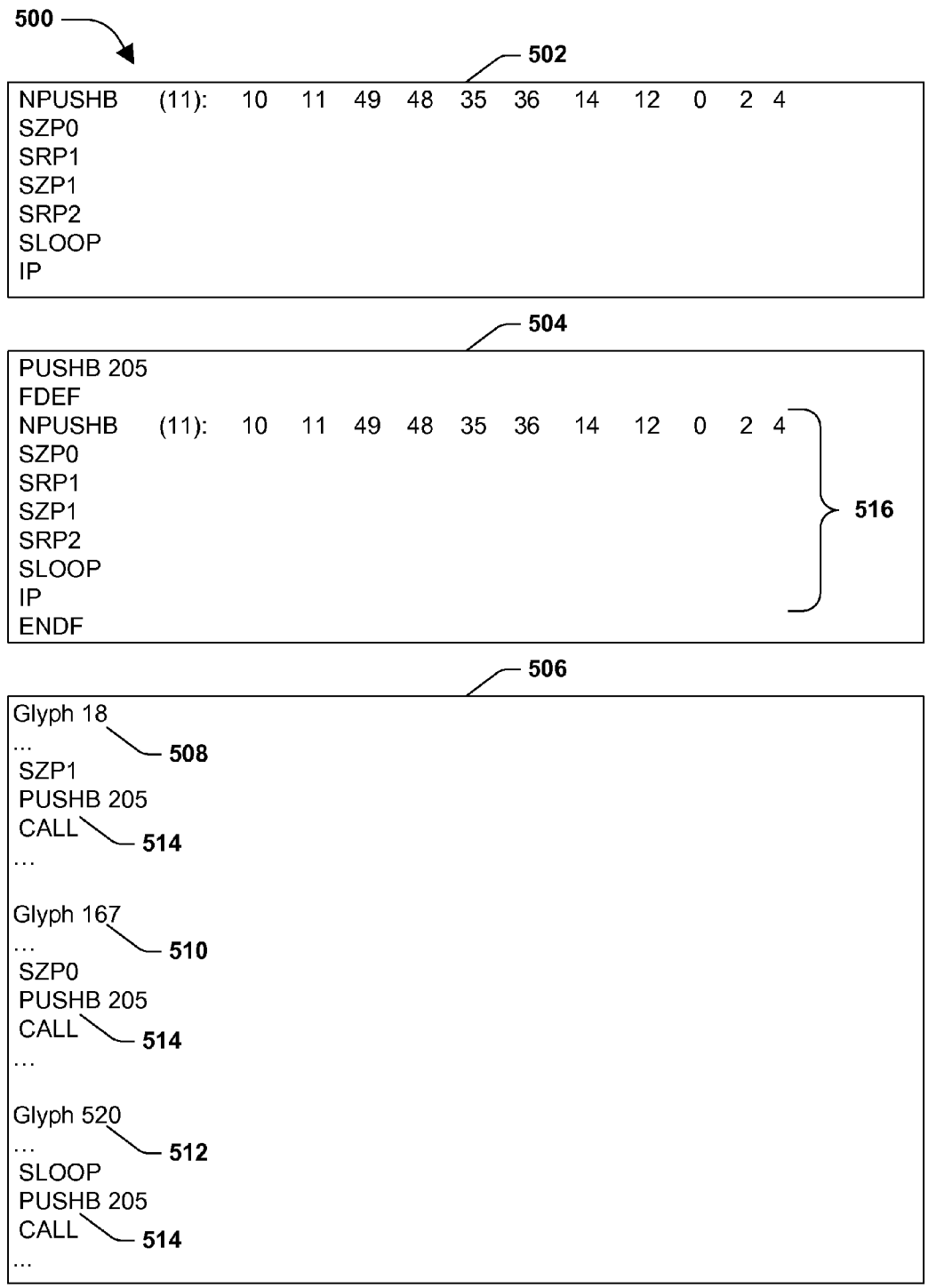
FIG. 5 is a diagram that illustrates an example embodiment where one or more portions of one or more techniques described herein may be implemented.

At 406, a function can be created for a common instruction set, for example, for the respective identified common instruction sets. As an illustrative example, FIG. 5 is a diagram that illustrates an example embodiment 500 where one or more portions of one or more techniques described herein may be implemented. A common instruction set 502 comprises font execution instructions that may have been identified in more than one location in a font program, or in respective font execution instructions for multiple glyphs (e.g., instructions for glyphs 302, 304, 306 of FIG. 3). Further, in this example embodiment 500, a function 504 can be created for the common instruction set 502. In this example, the created function 504 comprises the font execution instruction 516 from the identified common instruction set 502.

Returning to FIG. 4, at 408, defining the function can comprise functionalizing the common instruction set in a font or pre-program for the font, where the created function may be defined in a font control program, such as in the fpgm table. For example, a function may be defined (e.g., functionalized) in the Font Program (fpgm) table, and/or the pre-program (prep) for the font. Further, in one embodiment, the defined function may merely be functionalized in one location in the font program, for example, thereby by allowing the function of the common instruction set to be compressed. In one embodiment, defining the function for the common instruction set may comprise creating a function, comprising the common instruction set, in a font table of the font program.

In one embodiment, defining a function can comprise defining a custom instruction for the common instruction set. As described above, a custom function can comprise a custom instruction definition function, which may be defined in a control program for the font (e.g., fpgm and/or pre-program). As an example, a custom instruction definition function may be provided in a font platform for customizing fonts, such as to add functionality for future versions of the font. In this example, undefined op code (e.g., the common instruction set) may be used to define the custom instruction definition function (e.g., IDEF), such as in a font program table.

At 410 in the example embodiment 400, a call to the defined function can be inserted in the font execution instructions. For example, at the respective location in the font execution instructions where the common instruction set is identified, the common instruction set can be replaced with the call to the function that is defined in the font program file. In one embodiment, the common instruction set in the font execution instructions can be replaced with the defined custom instruction. Further, respective defined functions, or defined custom instructions, can replace corresponding common instruction sets identified in the font execution instructions, for example, thereby reducing a size of the font execution instructions.

As an illustrative example, in FIG. 5, compressed font execution instructions 506 comprise respective execution instructions for glyphs 508, 510, 512, for the font, where the common instruction set 502 has been replaced with a call 514 to the defined function 504. Further, when compared to the uncompressed font execution instructions, 300 in FIG. 3, it can be seen that the lines of execution instructions have been reduced from twenty five (300 in FIG. 3) to nineteen (504 and 506 in FIG. 5), for example, including the defined function (e.g., in the font program table). In one embodiment, for example, the compression ratio may increase dramatically when a common instruction set is found in even more (e.g., than three) locations, and/or for those common instruction sets that comprise a larger amount (e.g., lines of op code) of execution instructions, for example.

In one aspect, the identification of a common instruction set may be used for compressing more than one font. In one embodiment, in this aspect, the identified common instruction set may be used to identify a common instruction set in font execution instructions for a different font. For example, identification of the common instruction set can comprise a brute force character search, where respective characters, and/or sets of characters are selected and compared against the characters in the font execution instructions. However, in this embodiment, respective common instruction sets, such as identified in one or more font execution instructions, may be used as base search criteria to attempt to identify the same sets in other fonts.

For example, the common instruction set 502 of FIG. 5 may be identified in a first font, and may be used as a search criteria to match against font execution instructions in a second font. In this way, for example, a time, and/or computation resource cost, for common instruction set identification for a font may be reduced by starting with known common instruction sets.

Further, in one embodiment in this aspect, a function that is defined for a common instruction set may be used for more than one font. In this embodiment, the function (e.g., a standard and/or custom function) may be functionalized in a font control program that is used for more than one font. As an example, a common table may be employed by a font control program, where the common table comprises one or more defined functions for corresponding common instruction sets. In this way, for example, the font execution instructions may be further compressed by reducing an amount of defined functions for respective fonts.

In one aspect, a common instruction set may be nested in another common instruction set. In one embodiment, in this aspect, a first function can be defined (e.g., in the font program table) for a first common instruction set, where the first common instruction set is nested inside a second common instruction set, in the font execution instructions for a font.

Further, a second function can be defined for the second common instruction set. In one embodiment, the first common instruction set can be replaced with a call to the defined first function, and/or the second common instruction set can be replaced with a call to the defined second function.

As an example, the second (nested) common instruction set may be replaced with the second call to the second defined function. Further, in this example, the first common instruction set, now comprising the call to the second defined function, can be defined as the first function. Additionally, the first common instruction set may be replaced with a call to the first function (e.g., which also comprises a call to the second defined function). In this way, for example, the font execution instruction may be further compressed by reducing an amount of instructions in the defined functions.

A system may be devised for reducing a size of a font execution program (e.g., comprising one or more font files). A font execution program can comprise programming code and programming tables that provide for rendering glyphs on a display according to a designer's desired output. Similar to other types of programming code, respective lines of the font execution program can comprise instructions on how to render the font. A number of font execution instructions can be reduced, for example, by replacing portions of the same font execution instructions, which may be common in several areas of the program, with a call to a function defined for the common execution instructions.

Figure 6:
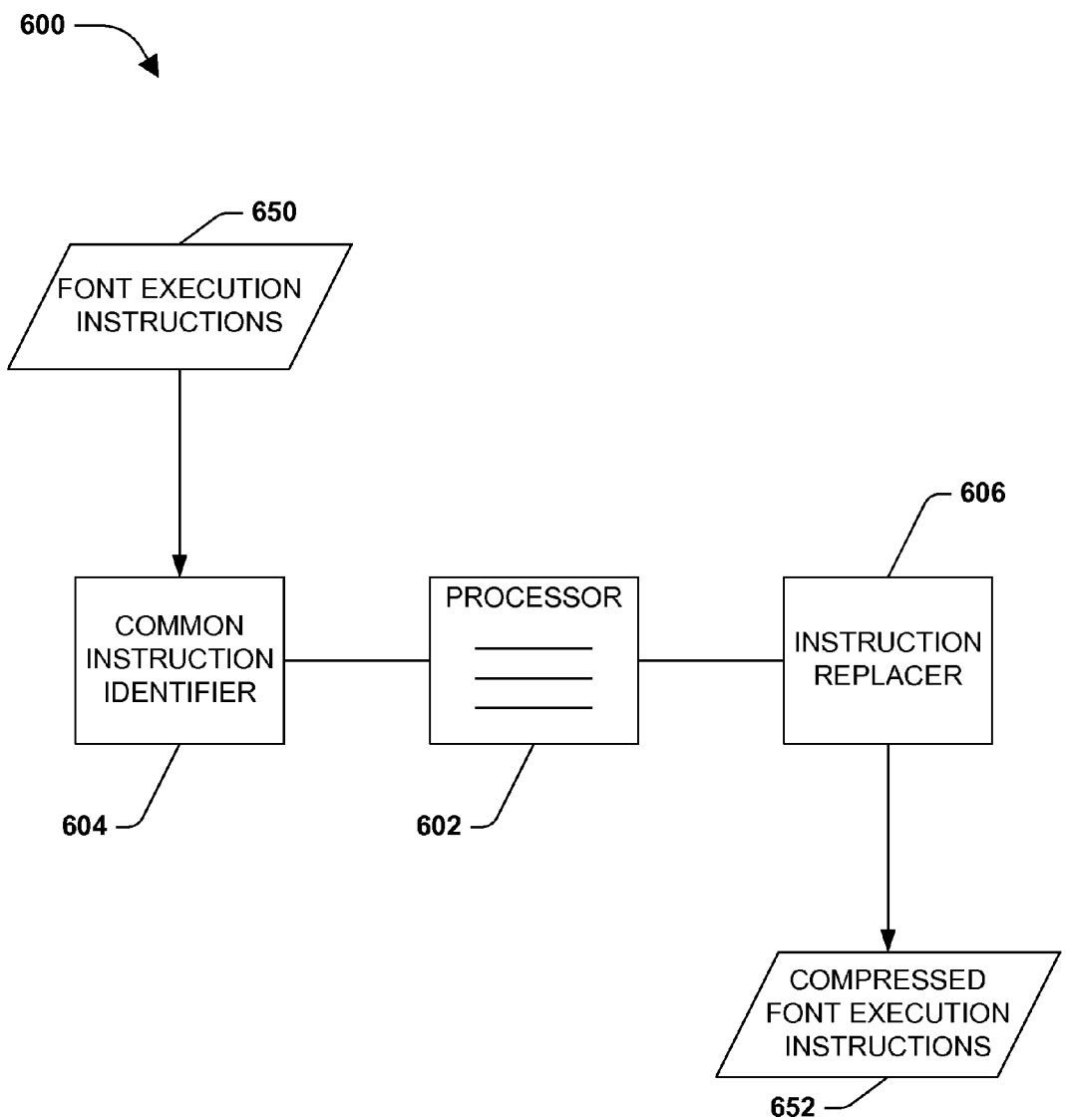
FIG. 6 is a component diagram illustrating an exemplary system for reducing execution instructions for a font.

FIG. 6 is a component diagram illustrating an exemplary system 600 for reducing execution instructions for a font. A computer-based processor 602 is configured to process data for the system and is operably coupled with a common instruction identification component 604. The common instruction identification component 604 is configured to identify a common instruction set in the font execution instructions 650. For example, the font execution instructions 650 can comprise instructions, such as programming code, on how to render a font (e.g., interpreted by a rasterizer). Further, the font execution instructions 650 may comprise a set of instructions that are the same in more than one location, for example, comprising a common instruction set. In this example, the common instruction identification component 604 can scan the font execution instructions to identify one or more sets of common instructions.

In the exemplary system 600, an instruction replacement component 606 is operably coupled with the processor, and is configured to replace an identified common instruction set in the font execution instructions with a call to a function defined for the identified common instruction set. For example, respective functions can be defined for one or more identified common instruction sets, and the instruction replacement component 606 can create compressed font execution instructions 652 by removing the respective common instruction sets throughout the font execution instructions and replacing them with a call to corresponding defined functions. In this way, for example, a number of lines of code used for the font execution instruction are reduced, as a function call is typically much smaller than the corresponding common instruction set (used to replace a common instruction set).

Figure 7:
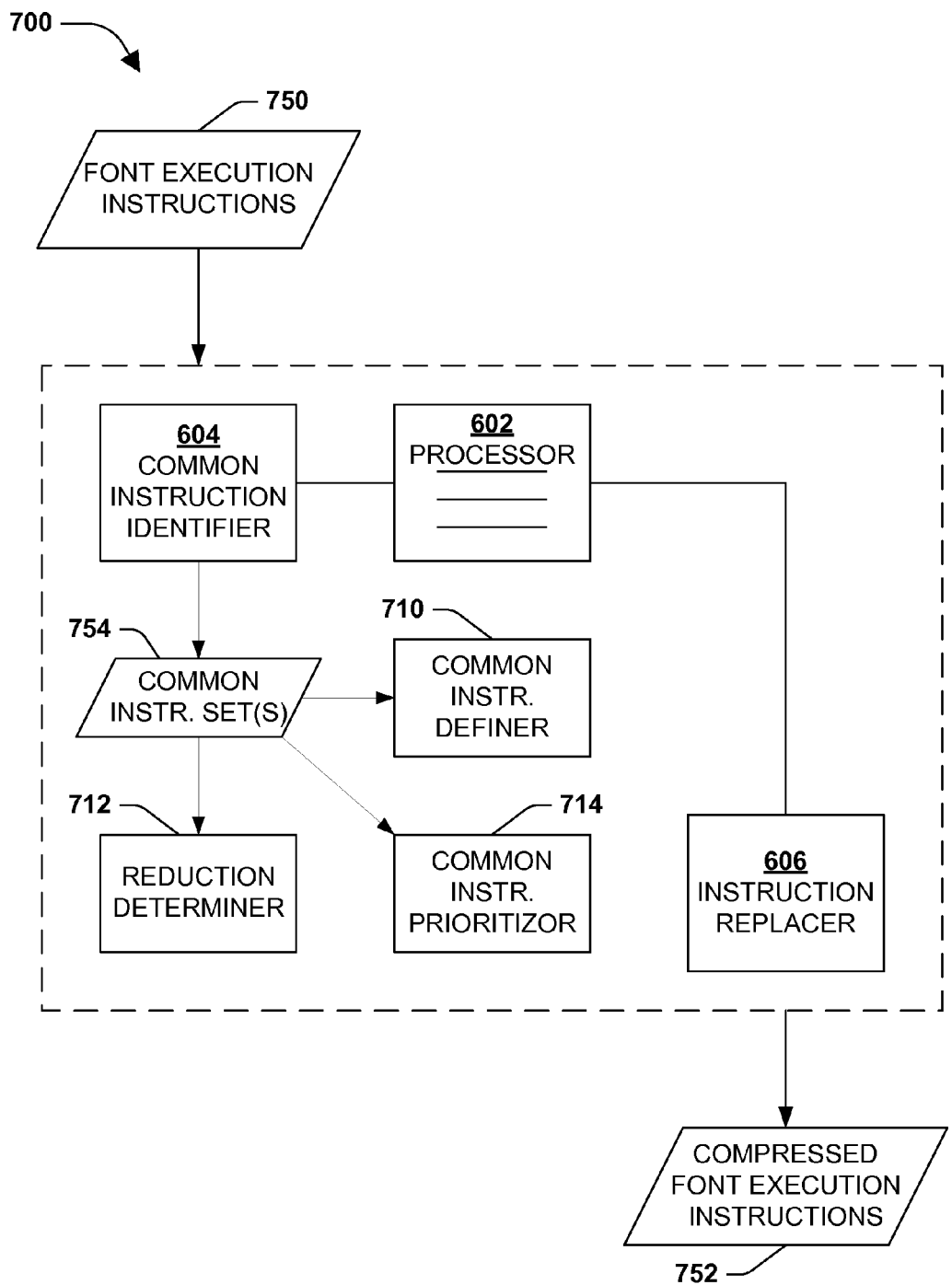
FIG. 7 is a component diagram illustrating an example embodiment where one or more systems described herein may be implemented.

FIG. 7 is a component diagram illustrating an example embodiment 700 where one or more systems described herein may be implemented. In this example 700, an extension of FIG. 6 is provided and thus description of elements, components, etc. described with respect to FIG. 6 may not be repeated for simplicity. In one embodiment, common instruction set(s) 754 identified in font execution instructions 750 by the common instruction identification component 604 can comprise a set of one or more common font execution instructions (e.g., common glyph execution instructions) that are identified in a plurality of locations in the font execution instructions.

In the example embodiment 700, a reduction determination component 712 can be configured to determine whether a desired file size reduction threshold is met when compressing the common instruction set(s) 754 in the font execution instructions 750. In one embodiment, the instruction replacement component 606 can be configured to replace the common instruction set(s) 754 merely if the desired file size reduction threshold is met. For example, if the reduction determination component 712 determines that replacing the one or more common instruction sets in the font execution instructions with corresponding calls to a function reduces the font files by a desired threshold amount, the instruction replacement component can perform the replacement; otherwise, for example, the compression (e.g., replacement with a call) may not occur.

In the example embodiment 700, a common instruction prioritization component 714 can be configured to prioritize one or more common instruction sets 754 for replacement in the font execution instructions 750, based at least in part upon a threshold number of instruction replacements for the font. For example, a font type may restrict a number of functions that can be used to replace instructions in the font execution instructions. In this example, the common instruction prioritization component 714 can determine which common instruction set(s) may be functionalized and replaced in the font execution instructions based on a number of times a common instruction set appears in the font execution instructions and/or a length of a common instruction set. For example, replacing a common instruction set that appears more frequently and/or is longer than other common instruction sets may generally lead to greater compression.

In the example embodiment 700, a common instruction defining component 710 can be configured to define the function for the common instruction set(s) 754. In one embodiment, the defined function can comprise a standard function (e.g., a FDEF function for TrueType fonts), and/or a custom instruction function (e.g., an IDEF function for TrueType fonts). For example, the common instruction defining component 710 can create a function for an identified common instruction set, and define the function in the font execution instructions (e.g., in a font program (fpgm) table). In this example, calls to one or more defined functions can be used to replace corresponding common instruction sets, resulting in compressed font execution instructions 752.

Figure 8:
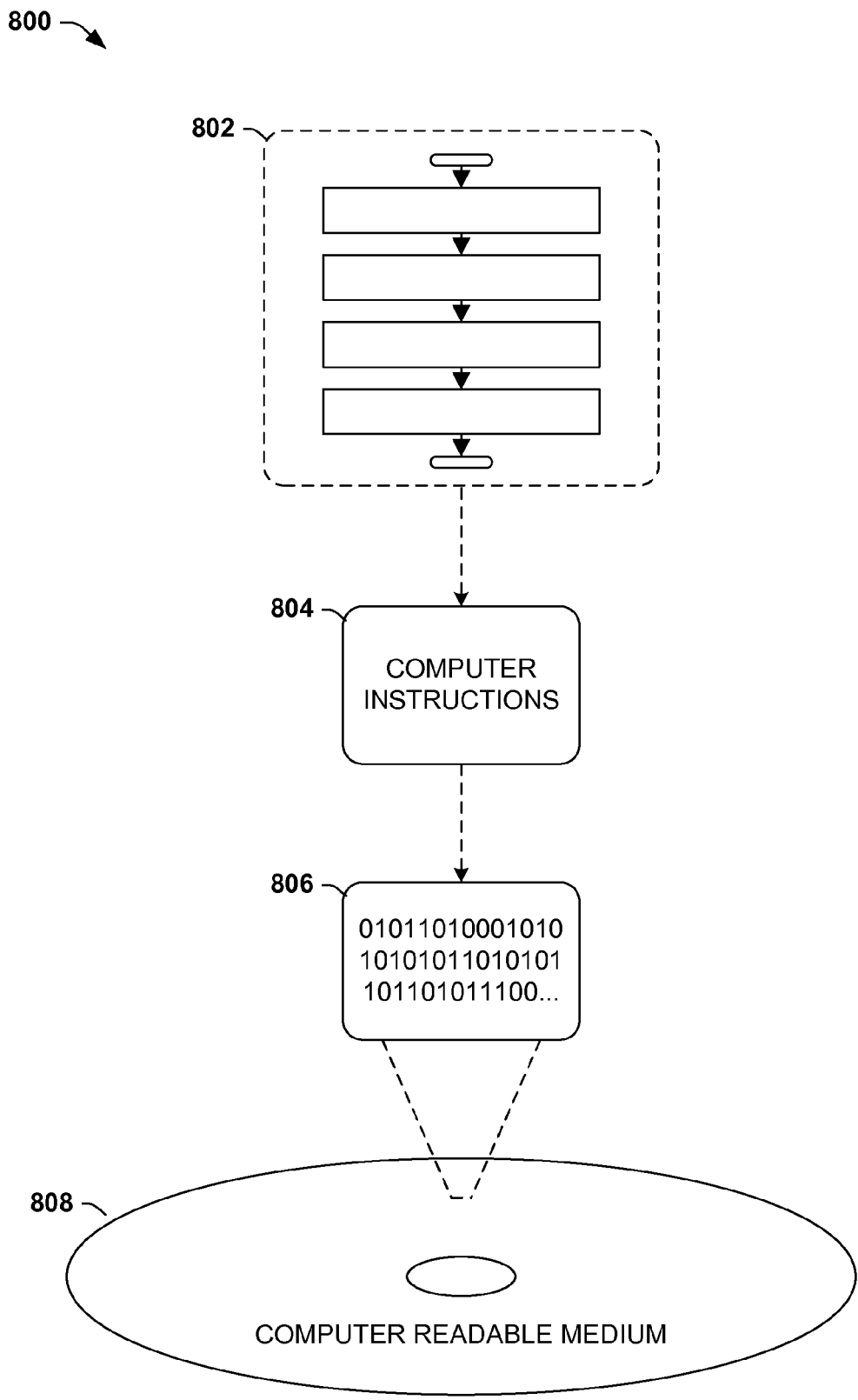
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
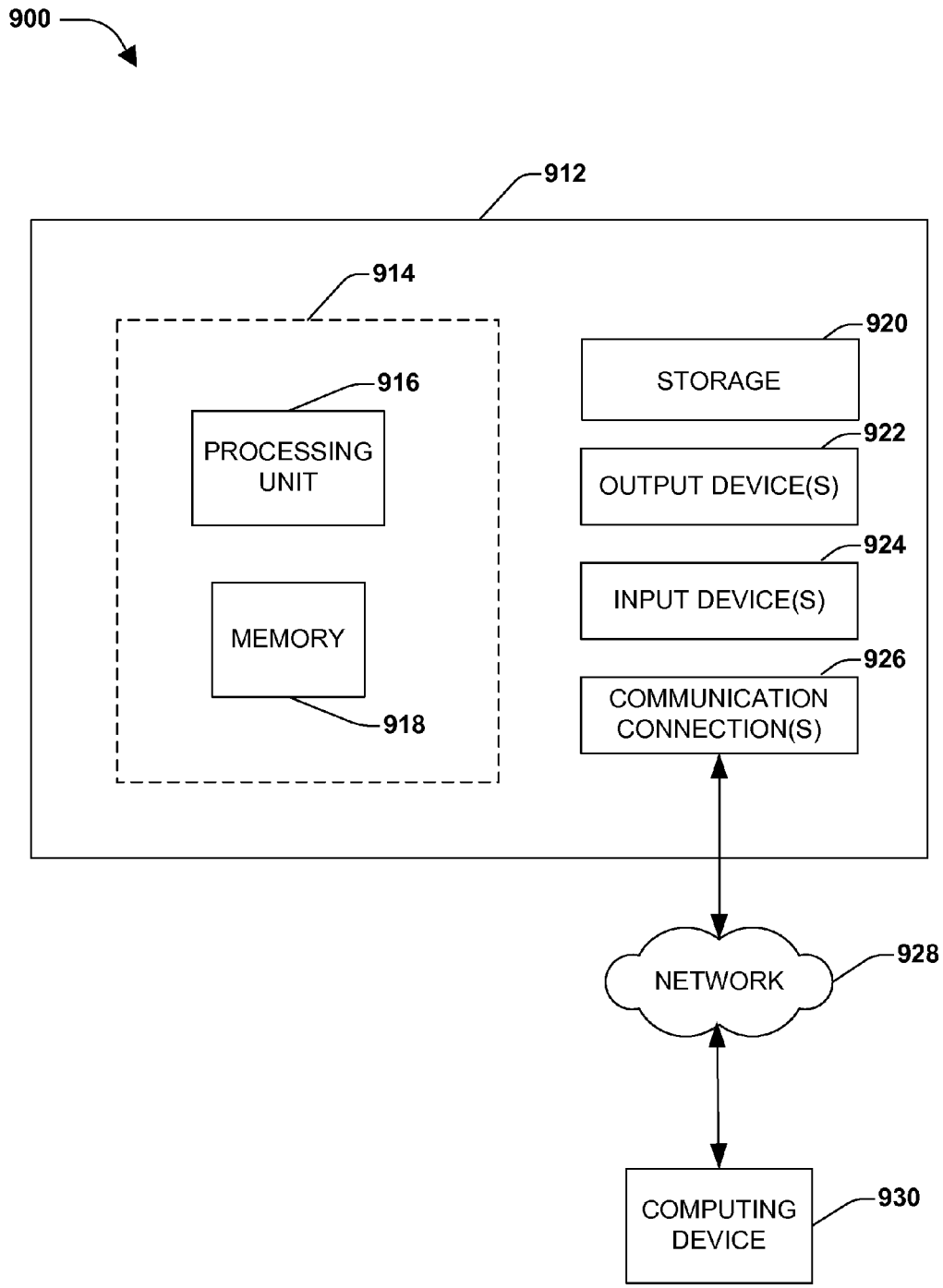
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for reducing font execution instructions for a font on a device having a processor, the method comprising:
    executing by the processor instructions that cause the device to:
        identify, within the font execution instructions, a common instruction set having at least two occurrences within the font execution instructions;
        insert into the font execution instructions a function encapsulating the common instruction set; and
        replace the common instruction set in the font execution instructions with a call to the function.

2. The method of claim 1, wherein executing the instructions further causes the device to, using the common instruction set, identify the common instruction set in font execution instructions of a second font.

3. The method of claim 1, wherein executing the instructions further causes the device to:
    determine whether a desired file size reduction threshold is met when compressing the common instruction set in the font execution instructions; and
    define the function for the common instruction set if the desired file size reduction threshold is met.

4. The method of claim 3, wherein determining whether the desired file size reduction threshold is met further comprises: identifying a performance cost for reducing the size of the font execution instructions.

5. The method of claim 1, wherein defining the function further comprises: defining a custom instruction for the common instruction set that invokes the call of the function.

6. The method of claim 5, wherein executing the instructions further causes the device to replace the common instruction set in the font execution instructions with the defined custom instruction.

7. The method of claim 5, wherein defining the function further comprises functionalizing the common instruction set in a control program for the font.

8. The method of claim 1, wherein executing the instructions further causes the device to prioritize a first common instruction set over a second common instruction set for compression if a threshold number of instruction replacements is met.

9. The method of claim 1, wherein executing the instructions further causes the device to disable use of the function for the common instruction set.

10. The method of claim 1, wherein executing the instructions further causes the device to:
    define a first function for a first common instruction set, the first common instruction set comprising a nested instruction set in a second common instruction set identified in the font execution instructions;
    define a second function for the second common instruction set;
    replace the first common instruction set in the font execution instructions with a call to the defined first function; and
    replace the second common instruction set in the font execution instructions with a call to the defined second function.

11. A system for reducing execution instructions for a font on a device having a memory and a processor, the system comprising:
    a common instruction identifier comprising instructions stored in the memory that, when executed by the processor, cause the device to:

identify, within the font execution instructions, a common instruction set having at least two occurrences within the font execution instructions; and insert into the font execution instructions a function encapsulating the common instruction set; and an instruction replacer comprising instructions stored in the memory that, when executed by the processor, cause the device to replace the common instruction set in the font execution instructions with a call to the function.

12. The system of claim 11, further comprising: a reduction determiner comprising instructions stored in the memory that, when executed by the processor, cause the device to determine whether a desired file size reduction threshold is met when compressing the common instruction set in the font execution instructions.

13. The system of claim 12, wherein the instruction reducer further replaces the common instruction set only if the desired file size reduction threshold is met.

14. The system of claim 11, further comprising: a prioritizer comprising instructions stored in the memory that, when executed by the processor, cause the device to prioritize at least one common instruction set for replacement in the font execution instructions based at least in part upon a threshold number of instruction replacements for the font.

15. A memory device storing instructions that, when executed by a processor on a computer, cause the computer to reduce font execution instructions for a font, by:

identifying, within the font execution instructions, a common instruction set comprising a set of one or more common execution instructions identified in at least two locations in the font execution instructions;

determining whether a desired file size reduction threshold is met when compressing the common instruction set in the font execution instructions;

inserting into the font execution instructions a function encapsulating the common instruction set if the desired file size reduction threshold is met; and replacing the common instruction set in the font execution instructions with a call to the function.

16. The method of claim 5, wherein defining the custom instruction further comprises: creating the custom instruction for the common instruction set in a control program for the font.

17. The method of claim 1, wherein executing the instructions further causes the device to disable use of a custom instruction for the common instruction set.

18. The system of claim 12, wherein the reduction determiner further identifies a performance cost for reducing the size of the font execution instructions.

19. The system of claim 11, wherein the a common instruction identifier further identifies the common instruction set in the font execution instructions of a second font.

20. The memory device of claim 15, wherein the instructions, when executed on the processor, further cause the computer to identify a performance cost for reducing the size of the font execution instructions.

* * * * *